United States Patent [19]

Hubertson et al.

[11] Patent Number: 4,968,000
[45] Date of Patent: Nov. 6, 1990

[54] VALVE

[75] Inventors: Folke Hubertson; Curt O. Nilsson, both of Säffle, Sweden

[73] Assignee: Aktiebolaget Somas Ventiler, Säffle, Sweden

[21] Appl. No.: 361,881

[22] Filed: Jun. 6, 1989

[30] Foreign Application Priority Data

Jun. 17, 1988 [SE] Sweden .................... 8802299

[51] Int. Cl.⁵ ............................. F16K 5/06
[52] U.S. Cl. ......................... 251/171; 251/315
[58] Field of Search ................ 251/172, 315, 171

[56] References Cited

U.S. PATENT DOCUMENTS

| | | | |
|---|---|---|---|
| 3,346,234 | 10/1967 | Allen | 251/174 |
| 3,401,914 | 9/1968 | Shand | 251/174 R |
| 3,794,291 | 2/1974 | Suyama | 251/171 |
| 4,273,309 | 6/1981 | Morrison | 251/174 |
| 4,345,738 | 8/1982 | Repirt | 251/315 |

FOREIGN PATENT DOCUMENTS 2403571  8/1974  Fed. Rep. of Germany .

Primary Examiner—John C. Fox
Attorney, Agent, or Firm—Armstrong, Nikaido, Marmelstein, Kubovcik & Murray

[57] ABSTRACT

A valve with a valve body (11, 43) in the form of a ball or of a segment of a ball has a second, concave, spherical sealing surface (20, 53) which is provided to be resiliently urged against a first sealing surface of the valve body, and at least an outer, cylindrical surface (21, 65, 66) which slidingly contacts a cylindrical guiding surface (22, 55, 56) of equal diameter in the central part of the valve housing. A spring washer (17, 82) abuts an end surface (24, 73) of the seat ring and is firmly clamped with its peripheral portion between an end surface (27, 81) of the central part of the valve housing and an end surface (28, 62) of an end fitting. The end surface of the seat ring comprises an annular abutment surface (24, 73) at a radial distance from an interior of the peripheral portion of the spring washer. The abutment surface is projected in the axial direction toward the end fitting relative to a first, annular portion (23, 70) of said end surface of the seat ring.

2 Claims, 3 Drawing Sheets

VALVE

TECHNICAL FIELD

This invention relates to a valve with a valve body in the form of a ball or of a segment of a ball, said valve body being provided with a first spherical sealing surface; a valve housing in which the valve body is rotatable about an axis of rotation between a closed position and an open position, the valve housing comprising a central or main part and at least in one end a covering plate or an end fitting; a passage for fluid through the valve housing and through the valve body when the valve body is in its closed position; at least one seat ring exhibiting a second, concave, spherical sealing surface which is provided to be resiliently urged against said first sealing surface on the valve body, an outer cylindrical surface which slidingly contacts a cylindrical guiding surface of equal diameter in the central or main part of the valve housing, and at least one end surface which faces toward the said covering plate or end fitting; and a spring washer which abuts said at least one end surface of the seat ring, said spring washer having a peripheral portion and an inner portion.

BACKGROUND ART

Ball valves of the above described kind are generally known, e.g. through the following patent publications, namely U.S. Pat. No. 3,195,560, U.S. Pat. No. 3,894,718 and European patent publication No. 0 047 147, while a ball segment valve is known through the published international patent application No. PCT/SE87/00487.

BRIEF DISCLOSURE OF THE INVENTION

The purpose of the invention is to provide a valve which provides a good sealing action between the valve body and the seat ring as well as between the central or main part of the valve and the cover plate or end fitting, even if the seat ring is not resilient. Still another purpose is to make possible a good sealing also for high fluid pressures, which implies that not only must the seat ring be made from a hard, i.e. substantially non-flexible material, but also that no other flexible sealing members, such as O-rings or the like, shall be included in the sealing members of the valve which can be subjected to the high fluid pressure. Further it is another purpose to provide the good sealing action by means of only a very few, simple components.

These and other objectives can be achieved by the invention which is characterised by what is stated in the appended claims. Further objectives, advantages and features of the invention will be apparent from the following description of some preferred embodiments.

BRIEF DESCRIPTION OF THE DRAWINGS

In the following description of two preferred embodiments of the present invention, reference will be made to the appended drawings, in which.

DESCRIPTION OF PREFERRED EMBODIMENTS

Figure 1:
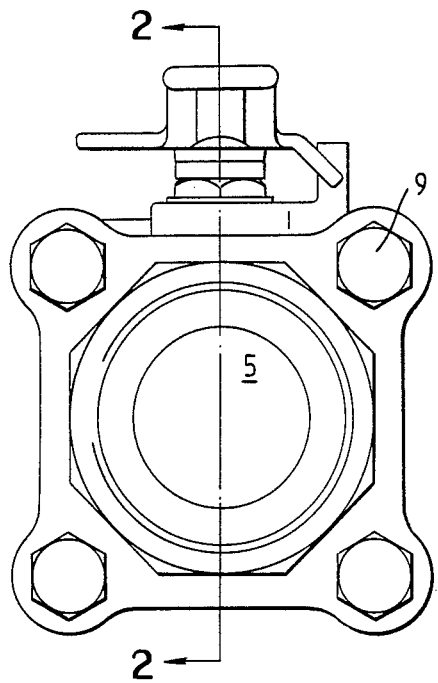
FIG. 1 shows a ball valve according to a first embodiment of the invention as viewed in a direction toward one end of the valve.
Figure 2:
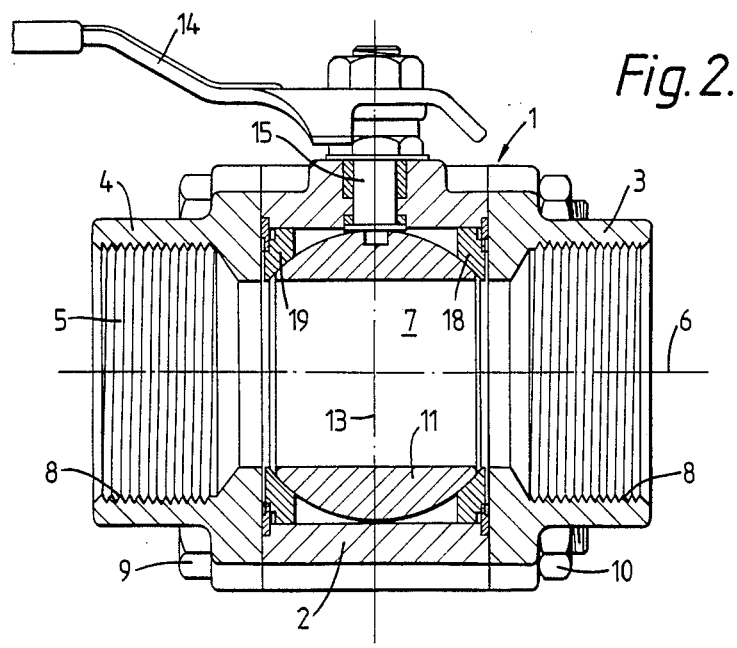
FIG. 2 shows a longitudinal section of the valve along line II—II of FIG. 1.
Figure 3:
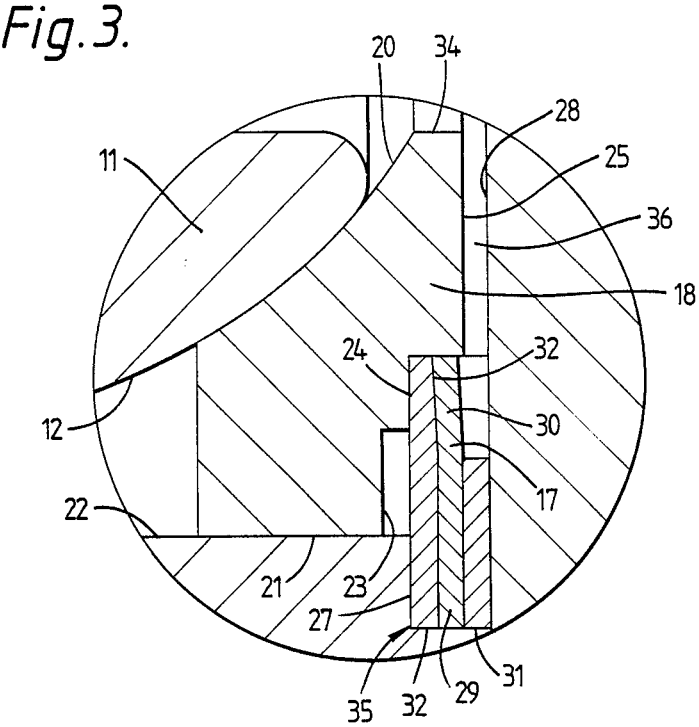
FIG. 3 illustrates the encircled portion of FIG. 2 at a larger scale.

With reference first to FIGS. 1-3, a valve housing of a ball valve is generally designated 1. The valve housing consists of a central part 2 and in each end an end part 3 and 4, respectively. Other terms are used interchangeably within this technical field instead of the term end part, as for example end fitting, and instead of the term central part there are also used the terms main or center body section. Inside the central part 2 there is a valve body which has the shape of a ball 11. The outer diameter of the ball 11 is, in a manner known to the art, only slightly smaller than the inner diameter of central part 2. A passage for a fluid has been designated 5, and the centerline of the passage has been designated 6. That part of passage 5 which extends through the ball 11 in the open position of the valve has been designated 7. The valve housing 1 is assembled to form an integral unit by means of screws 9 and nuts 10. The ball 11 can, with the aid of a handle 14, be rotated between its fully closed position and its open position about an axis of rotation 13 via an axle neck 15. Inner threads 8 are provided for the connection of tube conduits (not shown) to the end fittings 3 and 4.

The ball 11 is floatingly journalled in the valve housing according to conventional principles. A seat ring 18 and 19, respectively, provided in each end of the central part, are preferably of Stellite, although other metallic, ceramic, polymeric or composite materials can be used. FIG. 3 shows more in detail the design of the seat ring 18 (the seat ring 19 has an identical, equal shape) and adjacent portions of the central part 2 and the end fitting 3 of the valve housing (the other end fitting 4 has an identical, equal shape). The ball in a manner known per se is provided with two opposite, spherical sealing surfaces 12, which have been referred to as the first spherical sealing surface in the claims. The seat ring 18 has a second, concave, spherical sealing surface 20 which is provided to cooperate with the spherical sealing surfaces 12 of the ball 11. The seat ring 18 has an outer, cylindrical surface 21, which slidingly contacts the cylindrical inner surface 22 of the central part 2 of the valve housing 1. The two cylindrical surfaces 21 and 22 in other words have the same diameter with a slip fit, so that the inside surface 22 of the valve housing 1 will act as a guiding surface for the seat ring 18.

The thickness of the seat ring 18 in the axial direction is increased stepwise from said outer, cylindrical surface 21 towards an inner, cylindrical surface 34, so that there are formed three annular surfaces which are denominated a first annular portion 23 adjacent to the outer, cylindrical surface 21, a second annular portion 25 adjacent to the inner cylindrical surface 34, and between said first and second annular portions there is a third annular surface, also called an abutment surface 24.

A gap 36 is provided between the outer (second) annular surface 25 and the facing surface 28 of the end fitting 3. The breadth or thickness of the gap 36 may vary depending on the axial displacement of the seat ring 18 in the central part 2 of the valve housing 1.

An annular spring washer having a peripheral portion 29 and an inner portion 30 has been designated 17. The inner portion 30 is slightly bent relative to the peripheral, flat portion 29, as is shown in FIG. 3. A first packing ring has been designated 31 and a second packing ring has been designated 32. The latter one has the same inner and outer diameters, i.e. the same width, as the spring washer 17, while the first packing ring 31 has the same outer diameter as spring washer 17 but a smaller inner diameter than the spring washer.

The spring washer 17 is clamped with its peripheral portion 29 between an annular end surface 27 of a recess 35 of the central portion 2 of the valve housing and the facing surface 28 of the end fitting 3, the packing rings 31 and 32 being provided on each side of the spring washer 17 with the first, narrower packing ring 31 turned toward the end fitting 3 and with the broader, second packing ring 32 turned toward the central portion 2 of the valve housing and toward the seat ring 18, so that the inner portion 30 of the spring washer 17 will abut the abutment surface 24 via the inner portion of the second packing ring 32, while the first, narrower packing ring 31 will be located completely out of the boundary of the abutment surface 24. Further the spring washer 17 is slightly dished toward the abutment surface 24, so that the force of the spring action against the abutment surface 24 is augmented.

The valve sealing shown in FIGS. 2 and 3 is provided to work in the following manner. The spring washer 17, which is clamped between the valve housing parts 2 and 3, forces the hard seat ring 18 (and in an analogous manner also the seat ring 19) in the axial direction, the concave, spherical surface 18 of the seat ring 18 being in surface contact without play with the convex, spherical sealing surface 18 of the ball 11. The axial alignment is ensured through the interaction between the cylindrical surfaces 21 and 22. A good seal is achieved between the spherical surfaces 12 and 20 as well as between the parts 2, 3 and 4 of the valve housing 1.

Figure 4:
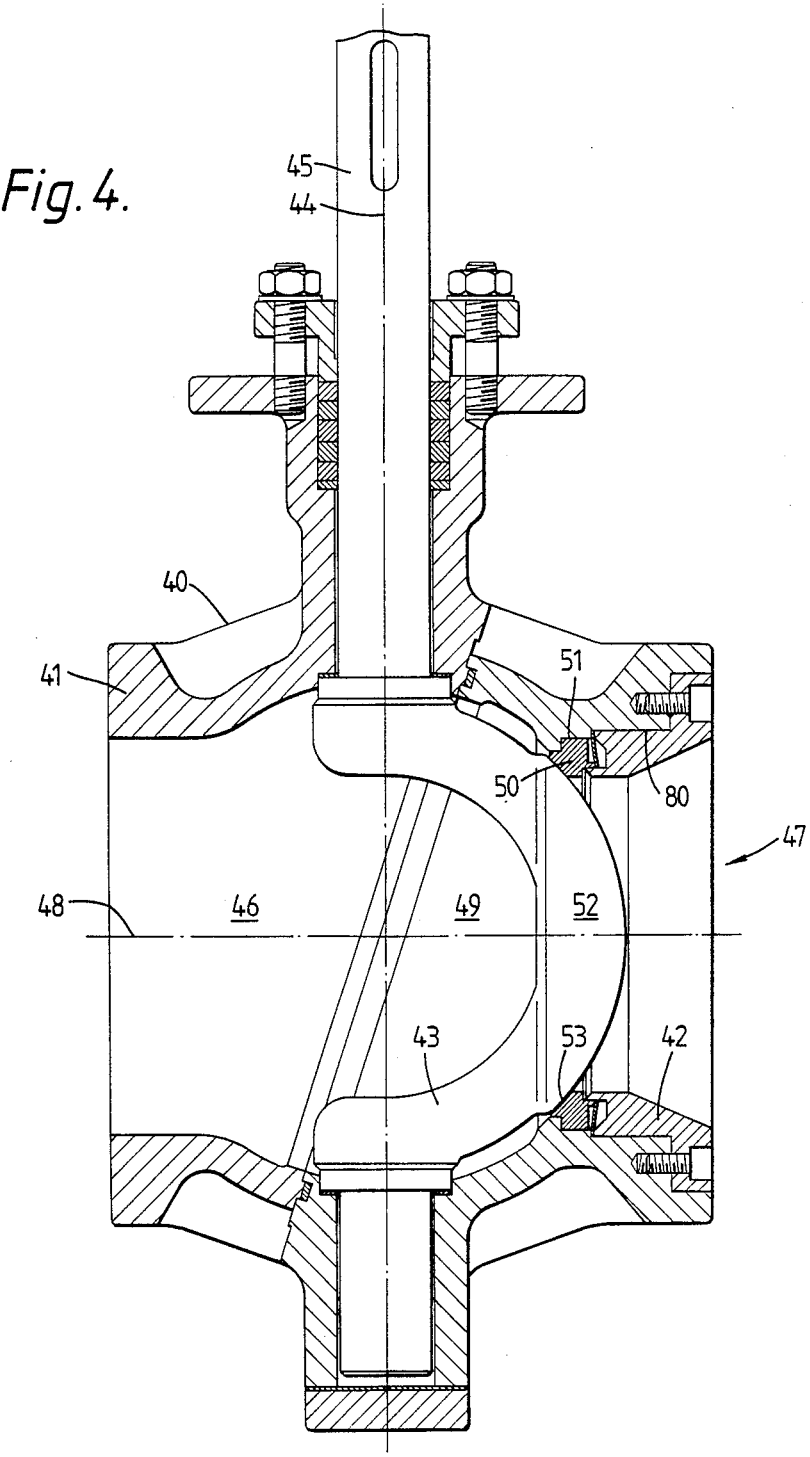
FIG. 4 shows an axial section through a ball segment valve according to a second embodiment of the invention.

FIG. 4 shows a ball segment valve comprising a valve housing generally designated 40 and consisting of a two piece main part 41 and a cover plate 42, which is screwed on the main part 41 and which therefore in this text is considered as an integral part of the valve housing 40. A valve body consists in a manner known per se of a spherical cap or segment of a sphere 43. The cap or segment of a sphere 43 is rotatable in the valve housing 40 about an axis of rotation 44 by means of a shaft 45 journalled in the valve housing. The entrance opening 47 of the fluid passage 46 through the valve is defined by the cover plate 42. The center line of the passage has been designated 48. The semicircular recess 49 of the valve body 43 defines part of the passage when the valve body is in the open position.

A valve seat ring 50 is located in a first recess 51 between the main part 41 of the valve housing and the cover plate 42. The seat ring 50 is homogenous and substantially non-resilient and may consist of metal, or of a hard alloy, preferably Stellite, or of a comparatively hard and non-elastic polymer, such as, e.g. polytetrafluorethene (PTFE) or polyurethane (PU) or a ceramic material, or of two or more composite materials, or of any other preferably, substantially non-elastic material or combination of materials. As the valve body—the ball segment 43—is rotated in the valve housing 40, the spherical sealing surface 52 of the spherical segment will slide against a concave, spherical sealing surface 53 of equal diameter, said spherical sealing surface 53 having the shape of a concave, spherical segment of the seat ring 50.

A first recess 51 is defined by a first, cylindrical guiding surface 55, a second, cylindrical guiding surface 56 having a slightly larger diameter than the first guiding surface 55, and by an annular end surface 57 located between the first guiding surface 55 and the second guiding surface.

The cover plate 42 is located in a second recess 80 in the main part 41 of the valve housing and has a recess 58 in that portion which faces the first recess 51. The recess 58 is defined by an inner, cylindrical guiding surface 59, an annular, flat bottom surface 60, a conical surface 61, and an outer, flat, annular end surface 62. An inner, flat, annular end surface of the cover plate 42 has been designated 63.

The seat ring 50 is limited in its radial direction by a first, outer, cylindrical surface 65 of the same diameter as the first cylindrical guiding surface 55 in the recess 51, and a second, outer, cylindrical surface 66 of the same diameter as and interacting with the second guiding surface 56 in the recess 51. An annular end surface 67, between the cylindrical surfaces 65 and 66, has the same dimensions as and faces the end surface 57 in the recess 51. A gap between the end surfaces 57 and 67 has been designated 68. The seat ring 50 is limited in the radial inward direction by an inner, cylindrical surface 69.

The seat ring 50 exhibits three annular end surfaces facing the cover plate 42, namely adjacent to the outer cylindrical surface 66 a first end surface 70, adjacent to the inner cylindrical surface 69 a second end surface 72, and therebetween a third end surface or annular abutment surface 73 which is the top surface of an annular, projecting flange 74. The flange 74 on its inner side is limited by a cylindrical guiding flange surface 75 having the same diameter as and being dimensioned to interact with the inner guiding surface 59 of the cover plate 42. A gap between said inner, annular end surface 63 of the cover plate 42 and said second, annular end surface 72 of the seat ring has been designated 79.

A flat, annular end surface, defining a transition between the recesses 51 and 80 has been designated 81. A flat, annular spring washer 82 is firmly clamped at its peripheral portion 83 between said outer, annular end surface 62 of the cover plate 42 and said annular end surface 81 between the recesses 80 and 51. The inner portion 84 of the spring washer 82 has one of its flat or side surfaces abutting against the abutment surface 73 of the flange 74 of the seat ring 50.

Figure 5:
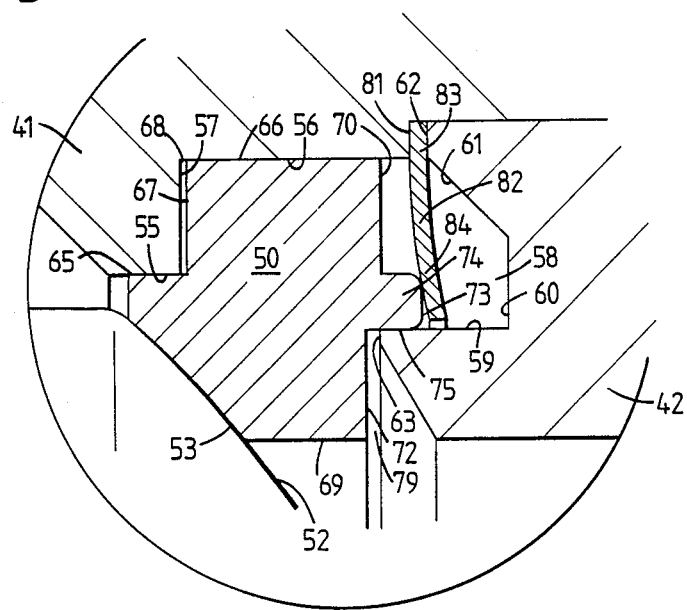
FIG. 5 illustrates the encircled portion of FIG. 4 at a larger scale.

The valve sealing described with reference to FIGS. 4 and 5 functions in the following way. The seat ring 50 is pressed in its axial direction against the spherical sealing surface 52 of the spherical segment 43 by means of the spring washer 82, which with its peripheral portion presses against flange 74 of the seat ring 50. The seat ring 50 is guided by three cylindrical guiding surfaces, namely the first cylindrical guiding surface 55, the second cylindrical guiding surface 56 in the recess 51 of the main part 41 of the valve housing, and the inner guiding surface 59 in the recess 58 of the cover plate 42, said guiding surfaces interacting with the corresponding cylindrical surfaces of the seat ring 50, namely the two outer, cylindrical surfaces 65 and 66 and the guiding flange surface 75, respectively. Through such guiding it is ensured that the seat ring is displaced only in the axial direction and without any jamming. At the same time there is also achieved a good sealing action between the spherical sealing surfaces 52 and 53 as well as between the end surfaces 62 and 81 via the inner portion 83 of the spring washer 82. The axial movement of the seat ring 50 is limited by the two gaps 68 and 79.

We claim:

1. A valve comprising a valve body in the form of a ball or a segment of a ball, said valve body being provided with a first spherical sealing surface;
   a valve housing in which the valve body is rotatable about an axis of rotation between a closed position and an open position, the valve housing comprising a central part and at least in one end an end fitting;
   a passage for a fluid through the valve housing and through the valve body when the valve body is in its open position;
   at least one seat ring having a second, concave, spherical sealing surface which is provided to be resiliently urged against said first sealing on the valve body, at least one outer cylindrical surface which slidingly contacts a first cylindrical guiding surface of equal diameter in the central part of the valve housing, a second cylindrical guiding surface which is turned toward said passage between said first outer guiding surface and an inner surface and wherein the end fitting has a cylindrical guiding surface which is turned away from the passage provided to interact with said second guiding surface of the seat ring and at least one end surface which is faced toward the said end fitting; and
   a spring washer which abuts said at least one end surface of said seat ring, said spring washer having a peripheral portion and an inner portion wherein said peripheral portion of the spring washer is firmly clamped between an end surface of the central part of the valve housing and an end surface of said end fitting, that said at least one end surface of said seat ring comprises an annular abutment surface at a radial distance from and interior of said peripheral portion of said spring washer, that said abutment surface projects in the axial direction toward the end fitting relative to a first annular portion of said at least one end surface, wherein said abutment surface is provided between said first annular portion of the seat ring and a second annular portion which is closer to the valve body and which projects relative to a second annular portion, an annular gap is provided between said second annular portion of the seat ring and an annular surface of the end fitting, the thickness of said gap limiting the displacement of the seat ring in the direction of the passage toward the end fitting, said first annular portion being located closer to the peripheral portion of said spring washer than said abutment surface, and the spring washer is arranged to indirectly, through packing, or directly exert a pressure with its inner portion against the projecting abutment surface of the seat ring.

2. A valve according to claim 1 wherein said second guiding surface of the seat ring constitutes a side of a projection upon which said abutment surface is located.

* * * * *